United States Patent [19]

Sorensen et al.

[11] 3,708,223

[45] Jan. 2, 1973

[54] COOLED MIRRORS

[75] Inventors: Ronald L. Sorensen, Thousand Oaks; Charlton Dunn, III, Chatsworth, both of Calif.

[73] Assignee: North American Rockwell Corporation

[22] Filed: April 2, 1971

[21] Appl. No.: 130,744

[52] U.S. Cl.....................................350/310, 165/61
[51] Int. Cl..............................................G02b 7/18
[58] Field of Search...................350/288, 310, 61–67, 350/299, 179, 311, 312, 318, 319, 93, 63; 165/61

[56] References Cited

UNITED STATES PATENTS

| | | | |
|---|---|---|---|
| 3,488,110 | 1/1970 | Evoy | 350/310 |
| 3,594,063 | 7/1971 | Smillie | 350/310 |
| 1,530,441 | 3/1925 | Thomson | 350/310 |

*Primary Examiner*—David Schonberg
*Assistant Examiner*—Michael J. Tokar
*Attorney*—L. Lee Humphries, Thomas S. MacDonald and D. Douglas Price

[57] ABSTRACT

Optical mirrors are provided, particularly for use as laser-cavity mirrors, including a face plate having an optically reflective surface in heat-exchanging relationship with coolant passages in which the flow of coolant in adjacent coolant passages is preferably counter-current in order to cool the optically reflective surface in a thermally balanced manner. Coolant is distributed to and collected from the coolant passages in the face plate by a first manifold plate. The first manifold plate has coolant distribution and collection passages for distributing coolant to and collecting coolant from the coolant passages in the face plate and manifold means for receiving and distributing coolant to each of the coolant distribution passages in the first manifold plate. The coolant collected by the coolant collection passages in the first manifold plate is distributed to coolant collection passages formed in a second manifold plate. Manifold means in the second manifold plate are provided for receiving coolant from each of the coolant collection passages in the second manifold plate and for conducting the coolant exteriorly of the mirror.

14 Claims, 4 Drawing Figures

PATENTED JAN 2 1973

INVENTORS.
RONALD L. SORENSEN
CHARLTON DUNN III
BY D. Douglas Price
ATTORNEY

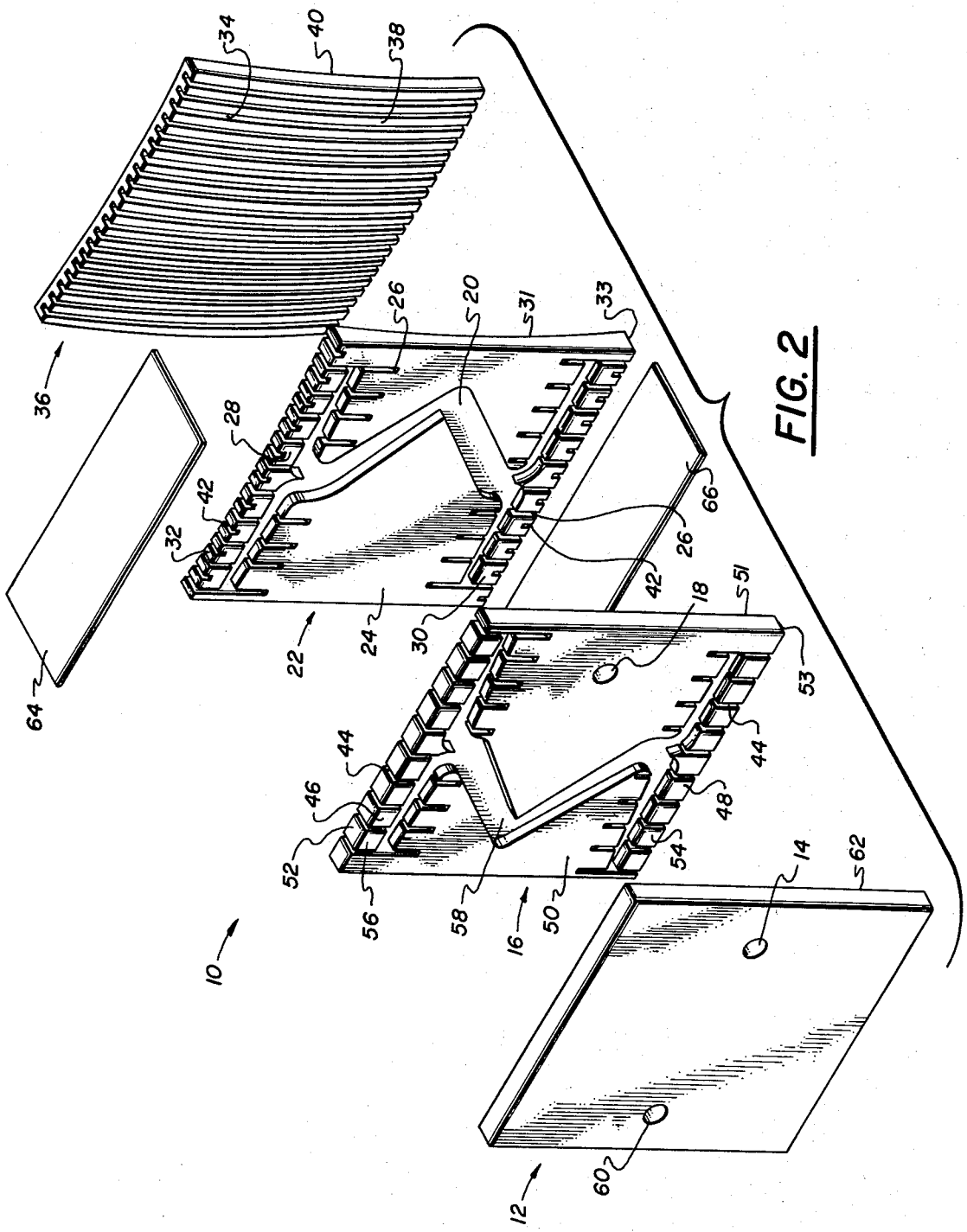

INVENTORS.
RONALD L. SORENSEN
CHARLTON DUNN III
BY
D. Douglas Price
ATTORNEY

COOLED MIRRORS

BACKGROUND OF THE INVENTION

Cooled mirrors are required in applications in which a high heat flux exists at the optically reflective surface of the mirror and in which only minimal thermal distortion of the optically reflective surface can be permitted. Laser-cavity mirrors, and particularly mirrors for high-powered, continuous wave lasers, are typical of mirrors which may require cooling in order to function properly. For example, surface flatness in laser-cavity mirrors is often specified to be within 1/10 or 1/20 of a wave length of light and frequently to be within 1/100 of a wave length of light. In other words, deviations from perfect flatness may represent less than 1/1,000,000 of an inch. The heat flux at the optically reflective surface of a laser-cavity mirror is typically within the range of 10 to 100 watts/cm$^2$ or higher for many conventional lasers (e.g., continuous wave $CO_2$ lasers). Accordingly, cooling of the laser-cavity mirrors may be required in order to maintain the stringent surface flatness requirements of the mirrors under the high heat fluxes present at the optically reflective surface.

Laser-cavity mirrors are mirrors used in a laser "optical cavity." A laser "optical cavity" typically comprises a cylindrical region located between two opposing plane parallel or curved mirrors located at right angles to the axis of the cylindrical region. The cylindrical region may be a crystal or gas envelope in which lasing action takes place. One of the mirrors is required to be partially transmissive in order to extract a useful beam of coherent light from the "optical cavity." The dimensioning of laser-cavity mirrors and the location of the mirrors with respect to the cylindrical region in which the lasing action takes place is well known in the art. See, for example, an article entitled, "Lasers," in the American Scientist, volume 51, No. 1, March 1963 with respect to lasers in general and with respect to the provision and location of laser-cavity mirrors.

SUMMARY OF THE INVENTION

Optical mirrors are provided, particularly for use as laser-cavity mirrors, including a first component having coolant distribution and collection passages and manifold means for receiving and distributing coolant to each of the coolant distribution passages. A second component is then provided having an optically reflective surface and coolant passages in heat-exchanging relationship with the optically reflective surface. Each of the coolant passages in the second component is in coolant flow communication with one of the coolant distribution and one of the coolant collection passages in the first component. A third component is then provided having coolant collection passages and manifold means for collecting coolant from each of the coolant collection passages in the third component and for discharging coolant from the mirror. The coolant collection passages in the third component are in coolant flow communication with the coolant collection passages in the first component.

The first component of the mirror is preferably a first manifold plate in which the coolant distribution and collection passages are formed in a first face of the manifold plate. At least a portion of each of the coolant distribution and collection passages in the first face of the first manifold plate extend through the first manifold plate. The second component is preferably a face plate in which the coolant passages are formed in a first face of the face plate and the optically reflective surface is formed on a second face of the face plate. The third component is preferably a second manifold plate in which the coolant collection passages and the manifold means are formed in a first face of the second manifold plate. At least a portion of each of the coolant collection passages in the first face of the second manifold plate extend through the second manifold plate. The face plate is bonded to and mated with the first manifold plate such that the coolant passages in the face plate are in coolant flow communication with the portions of the coolant distribution and collection passages extending through the first manifold plate and such that the second face of the first manifold plate acts as a closure for the coolant passages in the first face of the face plate. The face plate is preferably mated with the first manifold plate such that the flow of coolant in adjacent coolant passages in the face plate is counter-current in order to cool the optically reflective surface of the face plate in a thermally balanced manner. The second manifold plate is bonded to and mated with the first manifold plate such that the portions of the coolant collection passages extending through the second manifold plate are in coolant flow communication with the coolant collection passages in the first manifold plate and such that the second face of the second manifold plate acts as a closure for the coolant passages and manifold means in the first face of the first manifold plate.

Accordingly, it is an object of the present invention to provide a mirror which has coolant flow passages and manifold means formed therein for cooling the optically reflective surface of the mirror.

A further object of the present invention is to provide a mirror in which the optically reflective surface of the mirror is cooled in a thermally balanced manner by providing countercurrent coolant flow in adjacent coolant passages on the back side of the optically reflective surface of the face plate of the mirror.

A further object of the present invention is the provision of thermally balanced, cooled mirrors which are suitable for use as laser-cavity mirrors.

Further objects and advantages of the present invention will become apparent upon reading the undergoing specification and claims.

BRIEF DESCRIPTION OF THE DRAWINGS

FIG. 2 is an exploded, perspective view of the mirror of FIG. 1.

DESCRIPTION OF THE PREFERRED EMBODIMENTS

Figure 3:
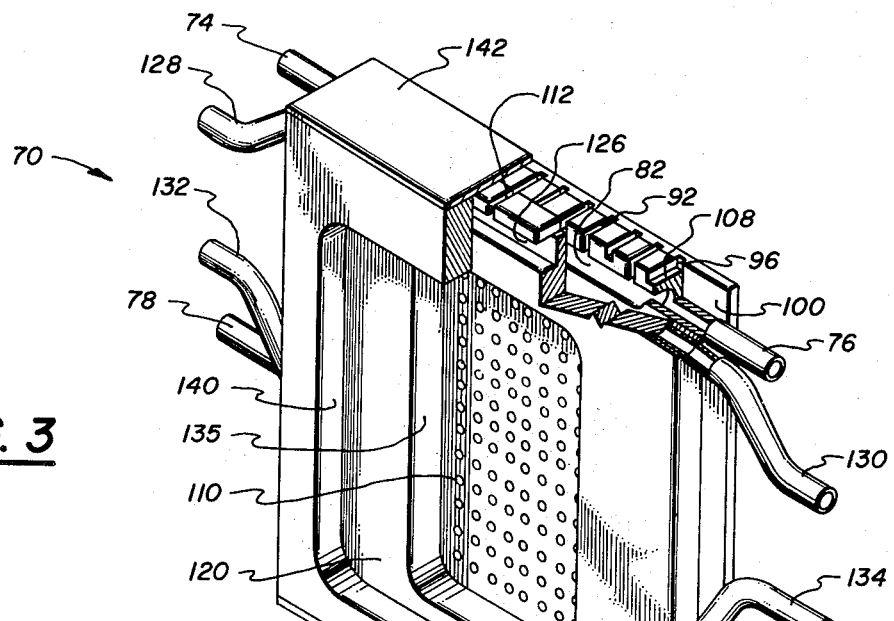
FIG. 3 is a partially cut-away, perspective view of a partially transmissive, thermally balanced, cooled mirror of the present invention.

The present invention is directed to optical mirrors preferably comprising a face and an a first manifold plate, a second manifold plate and a closure plate. The first manifold plate has coolant distribution and collection passages, which are generally parallel, longitudinal slots, formed in a first face of the first manifold plate. At least a portion of each of the coolant distribution and collection passages extends through the first manifold plate. Manifold means are formed in the first face of the first manifold plate for receiving and distributing coolant to each of the coolant distribution passages in the first manifold plate.

Coolant passages are formed in a first face of the face plate and an optically reflective surface is formed on the second face. The coolant passages and the optically reflective surface in the face plate are in heat-exchanging relationship. The coolant passages are generally parallel, longitudinal slots formed on the back side of the optically reflective surface of the face plate. The face plate is bonded to the first manifold plate such as by diffusion bonding. The face plate is mated with the first manifold plate such that the coolant passages in the face plate are in coolant flow communication with the portions of the coolant distribution and collection passages extending through the first manifold plate. The face plate is also mated with the first manifold plate such that the second face of the first manifold plate acts as a closure for the coolant passages in the first face of the face plate. Each of the coolant passages in the face plate is in coolant flow communication with a corresponding one of the coolant distribution and a corresponding one of the coolant collection passages in the first manifold plate. The coolant passages in the face plate and the coolant distribution and collection passages in the first manifold plate are preferably arranged and mated such that the flow of coolant in adjacent coolant passages in the face plate is countercurrent or, in other words, is in opposite directions in order to cool the optically reflective surface of the face plate in a thermally balanced manner.

The second manifold plate has coolant collection passages formed in a first face of the second manifold plate. At least a portion of each of the coolant collection passages extends through the second manifold plate. Manifold means, for collecting coolant from each of the coolant collection passages in the second manifold plate and for discharging coolant from the mirror, are formed in the first face of the second manifold plate. The second manifold plate is bonded to the first manifold plate such as by diffusion bonding. The second manifold plate is mated with the first manifold plate such that the portions of the coolant collection passages extending through the second manifold plate are in coolant flow communication with the coolant collection passages in the first manifold plate. The second manifold plate is also mated with the first manifold plate such that the second face of the second manifold plate acts as a closure for the coolant passages and manifold means in the first face in the first manifold plate.

The closure plate acts as a closure for the coolant collection passages and the manifold means in the first face of the second manifold plate and may also optionally provide inlet and exit means for the passage of coolant into and out of the mirror.

Figure 1:
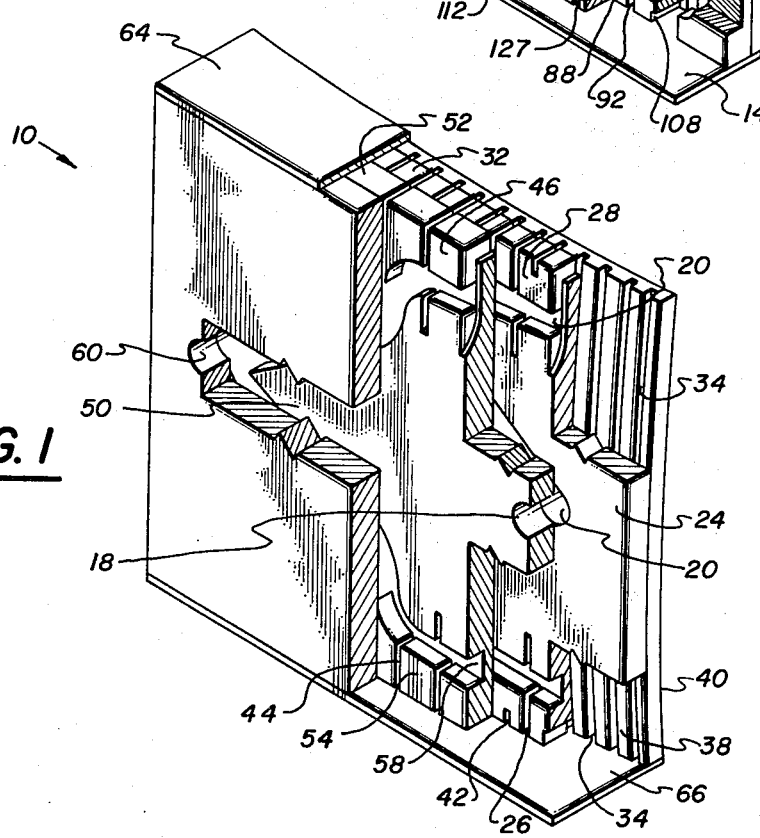
FIG. 1 is a partially cut-away, perspective view of a thermally balanced, cooled mirror of the present invention.

Referring now in detail to FIGS. 1 and 2, closure plate 12 in mirror 10 contains inlet means 14, shown as a circular aperture, for the introduction of coolant into the coolant distribution network of mirror 10. Manifold plate 16 contains inlet means 18, shown as a circular aperture, which is in coolant fow communication with inlet means 14 in closure plate 12 and with manifold means 20 in manifold plate 22. Inlet means 14 and 18 are of the same shape and are axially aligned so that no loss of coolant occurs to the interior of mirror 10. Inlet means 18 mates with manifold means 20 so that all of the coolant fluid passed through inlet means 18 is communicated to manifold means 20. Manifold means 20, shown as a curved channel, is formed in face 24 of manifold plate 22. Manifold means 20 is in coolant flow communication with each of coolant distribution passages 26 in manifold plate 22. The exact shape of manifold means 20 is not critical except that manifold means 20 should approximately equally distribute the inlet coolant flow from inlet means 18 between each of coolant distribution passages 26.

Coolant distribution passages 26, shown as parallel, longitudinal, equally spaced slots, are formed in upper side 28 and lower side 30 of face 24 of manifold plate 22. The upper end of each of coolant distribution passages 26 in upper side 28 and the lower end of each of coolant distribution passages 26 in lower side 30 of manifold plate 22 extends through manifold plate 22 from face 24 to face 31. Coolant distribution passages 26 are cut across or machined across upper and lower edges 32 and 33, respectively, of manifold plate 22. Each of the ends of coolant distribution passages 26 extending through manifold plate 22 is mated with and is in coolant flow communication with one of the ends of a coolant passage 34 in face plate 36. However, none of coolant distribution passages 26 are in coolant flow communication with more than one of coolant passages 34 in face plate 36.

Coolant passages 34, shown as parallel, longitudinal, equally spaced slots, are formed in face 38 of face plate 36. The exact shape and configuration of coolant passages 34 is not critical; however, coolant passages 34 should be arranged to evenly cool optically reflective face 40 of face plate 36. Each of coolant passages 34 in face plate 36 is mated with and is in coolant flow communication with one of coolant distribution passages 26 and one of coolant collection passages 42 in manifold plate 22. One of each adjacent pair of coolant passages 34 in face plate 36 is in coolant flow communication with a coolant distribution passage 26 in upper side 28 and a coolant collection passage 42 in lower side 30 of face 24 of manifold plate 22 and the other coolant passage of the adjacent pair of coolant passages 34 is in coolant flow communication with a coolant collection passage 42 in upper side 28 and a coolant distribution passage 26 in lower side 30 of face 24 of manifold plate 22. Accordingly, coolant flow is countercurrent or, in other words, is in opposite directions in adjacent coolant passages 34 in face plate 36.

Adjacent coolant distribution passages 26 and coolant collection passages 42 in manifold plate 22 are in coolant flow communication with the ends of adjacent coolant passages 34 in face plate 36. Adjacent coolant distribution passages 26 in manifold plate 22 are in coolant flow communication with the ends of subadjacent coolant passages 34 in face plate 36. In like manner, adjacent coolant collection passages 42 in manifold plate 22 are in coolant flow communication with the ends of subadjacent coolant passages 34 in face plate 36. The term "subadjacent" is used herein to mean a coolant passage which immediately follows or is immediately adjacent to an adjacent coolant passage. Face plate 36 is bonded to and mated with manifold plate 22 such that face 31 of manifold plate 22 acts as a closure for coolant passages 34 in face plate 36. Heat is evenly distributed to face 31 of manifold plate 22 by coolant flowing in coolant passages 34 in face plate 36. This even heating of face 31 of manifold plate 22 helps minimize the thermal distortion of optically reflective face 40 of face plate 36 which would be caused by the uneven thermal expansion of face plate 36 relative to manifold plate 22. Coolant is only communication between manifold plate 22 and face plate 36 via coolant distribution passages 26 and coolant collection passages 42 and the ends of coolant passages 34.

Coolant collection passages 42, shown as parallel, longitudinal, equally spaced slots, are formed in upper side 28 and lower side 30 of face 24 of manifold plate 22 and extend through manifold plate 22 from face 24 to face 31. Coolant collection passages 42 are cut across or machined across upper and lower edges 32 and 33, respectively, of manifold plate 22.

One of each adjacent pair of coolant passages in manifold plate 22 is a coolant distribution passage 26 and the other coolant passage of each adjacent pair is a coolant collection passage 42. Each coolant distribution passage 26 in upper side 28 of face 24 of manifold plate 22 is on the same longitudinal axis of face 24 of manifold plate 22 as a coolant collection passage 42 in lower side 30 of face 24 of manifold plate 22. In like manner, each coolant collection passage 42 in upper side 28 of face 24 of manifold plate 22 is on the same longitudinal axis of face 24 of manifold plate 22 as a coolant distribution passage 26 in lower side 30 of face 24 of manifold plate 22. Each of coolant collection passages 42 in manifold plate 22 is in coolant flow communication with a coolant collection passage 44 in manifold plate 16.

Coolant collection passages 44, shown as parallel, longitudinal, equally spaced slots, are formed in upper side 46 and lower side 48 of face 50 of manifold plate 16. The upper end of each of coolant collection passages 44 in upper side 46 and the lower end of each of coolant collection passages 44 in lower side 48 of face 50 of manifold plate 16 extends through manifold plate 16 from face 50 to face 51. Coolant collection passages 44 are cut or machined across the upper and lower edges 52 and 53, respectively, of manifold plate 16. Each of the ends of coolant collection passages 44 extending through manifold plate 16 is mated with and is in coolant flow communication with one of coolant collection passages 42 in manifold plate 22. Each of coolant collection passages 44 in upper side 46 of face 50 of manifold plate 16 is in coolant flow communication with one of coolant collection passages 42 in upper side 28 of face 24 of manifold plate 22. In like manner, each of coolant collection passages 44 in lower side 48 of face 50 of manifold plate 16 is in coolant flow communication with one of coolant collection passages 42 in lower side 30 of face 24 of manifold plate 22. Adjacent coolant collection passages 46 in manifold plate 16 are in coolant flow communication with adjacent coolant collection passages 42 in manifold plate 22.

The coolant collection passages 44 in upper side 46 of face 50 of manifold plate 16 are on the same longitudinal axis of face 50 of manifold plate 16 as the longitudinal center lines of the lands 54 which are formed by adjacent coolant collection passages 44 in lower side 48 of face 50 of manifold plate 16. In like manner, coolant collection passages 44 in lower side 48 of face 50 of manifold plate 16 are on the same longitudinal axis of face 50 of manifold plate 16 as the longitudinal center lines of the lands 56 which are formed by adjacent coolant collection passages 44 in upper side 46 of face 50 of manifold plate 16.

Manifold plate 16 is bonded to and mated with manifold plate 22 such that face 51 of manifold plate 16 acts as a closure for manifold means 20 and coolant distribution passages 26 in face 24 of manifold plate 22. Coolant flowing in manifold means 20 and coolant distribution passages 26 in manifold plate 22 is heated by heat transferred from face 31 of manifold plate 22. This heat is then transferred by the coolant to face 51 of manifold plate 16. Coolant collection passages 44 in manifold plate 16 are in coolant flow communication with manifold means 58 in manifold plate 16. Manifold means 58, shown as a curved channel, is formed in face 50 of manifold plate 16. The exact shape of manifold means 58 is not critical except that manifold means 58 should collect coolant from each of coolant collection passages 44 and conduct this coolant to exit means 60.

Closure plate 12 contains exit means 60, shown as a circular aperture, for discharging coolant from mirror 10. Exit means 60 mates with manifold means 58 such that no loss of coolant occurs to the interior of mirror 10. Closure plate 12 is mated with manifold plate 16 such that face 62 of closure plate 12 acts as a closure for coolant collection passages 44 and manifold means 58 in face 50 of manifold plate 16. Coolant flowing in manifold means 58 and coolant collection passages 44 in manifold plate 16 simultaneously heats face 50 of manifold plate 16 and face 62 of closure plate 12. Accordingly, manifold plate 16 is relatively evenly heated by the heat which is transferred to face 51 by the coolant flowing in manifold means 20 and coolant distribution passages 26 in manifold plate 22 and by the heat which is transferred to face 50 by the coolant flowing in manifold means 58 and coolant collection passages 44 in manifold plate 16. This even heating of manifold plate 16 helps minimize the thermal distortion of optically reflective face 40 of face plate 36 which would be caused by the uneven thermal expansion of face plate 36 relative to manifold plate 16. In like manner, the heating of closure plate 12 by coolant flowing in manifold means 58 and coolant collection passages 44 in manifold plate 16 helps minimize the thermal distortion of optically reflective face 40 of face plate 36 which would be caused by the uneven thermal expansion of face plate 36 relative to closure plate 12.

Upper edge cover 64 and lower edge cover 66 close out the coolant passages communicating with the upper and lower edges of manifold plates 16 and 22 and face plate 36 such that there is no coolant flow communication between adjacent coolant passages. Instead of employing separate edge covers, the upper and lower edges of manifold plates 16 and 22 and face plate 36 may be electro-formed over to close out the coolant passages contained therein.

Referring again to FIGS. 1 and 2, coolant enters inlet means 14 in closure plate 12 of mirror 10 and is passed through inlet means 18 in manifold plate 16 to manifold means 20 in manifold plate 22. Manifold means 20 approximately equally distributes the inlet coolant flow to each of coolant distribution passages 26 in manifold plate 22. Coolant distribution passages 26 direct the coolant into coolant passages 34 in face plate 36. The coolant travels longitudinally and in opposite directions in adjacent coolant passages 34 and is then led into coolant collection passages 42 in manifold plate 22. Coolant collection passages 42 direct the coolant to coolant collection passages 44 in manifold plate 16. Coolant collection passages 44 direct the coolant into manifold means 58 in manifold plate 16. The coolant is then passed by manifold means 58 to exit means 60 in closure plate 12 where the coolant is discharged from mirror 10.

Figure 4:
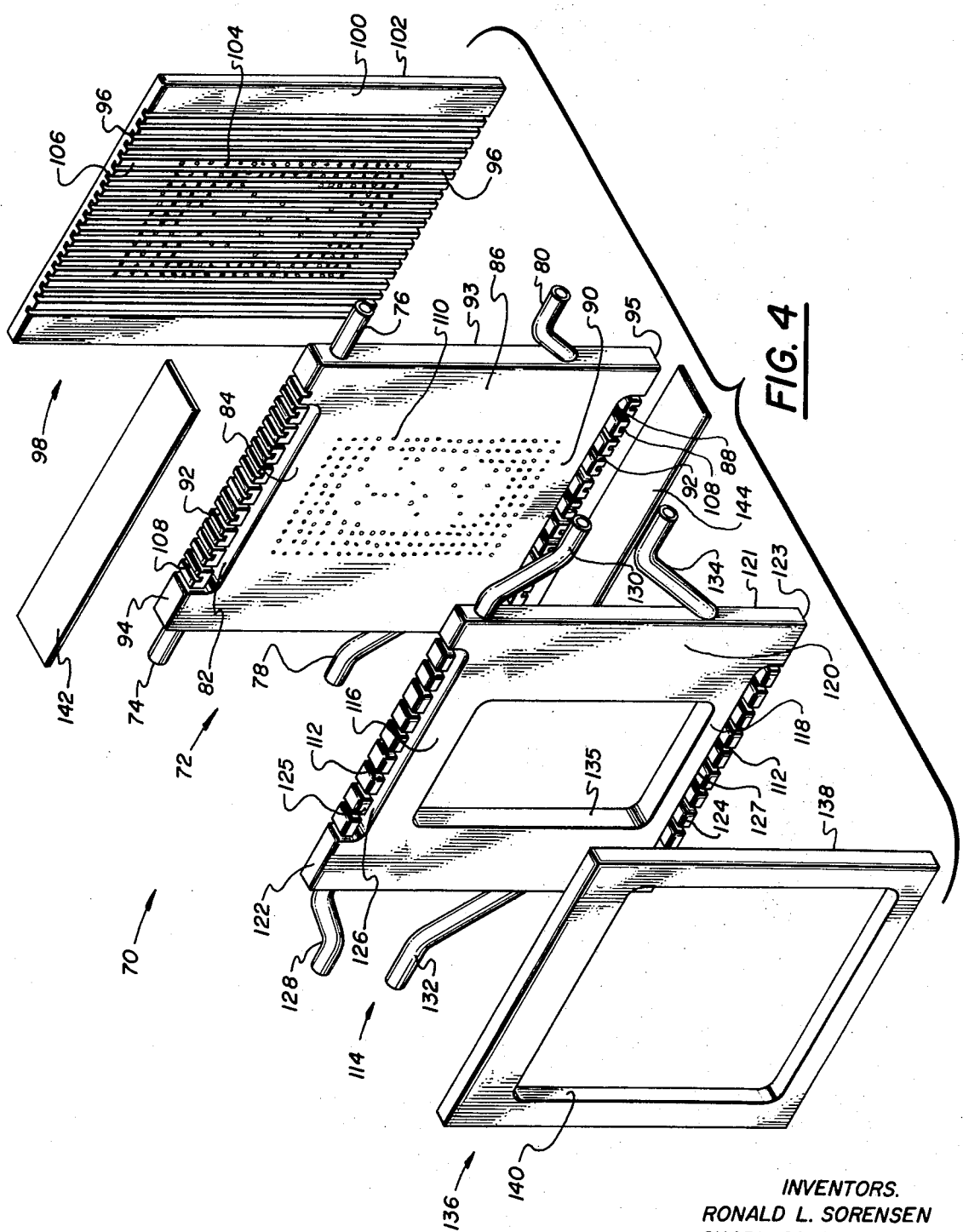
FIG. 4 is an exploded, perspective view of the mirror of FIG. 3.

Referring now in detail to FIGS. 3 and 4, manifold plate 72 in mirror 70 has inlet means 74, 76, 78 and 80, shown in the figure as hollow tubes, for the introduction of coolant into the coolant distribution network of mirror 70. Inlet means 74 and 76 lead to manifold means 82 formed in upper side 84 of face 86 of manifold plate 72. Inlet means 78 and 80 lead to manifold means 88 formed in lower side 90 of face 86 of manifold plate 72. Manifold means 82 and 88 are in coolant flow communication with coolant distribution passages 92 in manifold plate 72. The exact shape of manifold means 82 and 88, shown as transverse channels, is not critical except that the manifold means should approximately equally distribute the inlet coolant flow to each of coolant distribution passages 92.

Coolant distribution passages 92, shown as parallel, longitudinal, equally spaced slots, are formed in upper side 84 and lower side 90 of face 86 of manifold plate 72. The upper end of each of coolant distribution passages 92 in upper side 84 and the lower end of each of coolant distribution passages 92 in lower side 90 extends through manifold plate 72 from face 86 to face 93. Coolant distribution passages 92 are cut across or machined across upper and lower edges 94 and 95, respectively, of manifold plate 92. Each of the ends of coolant distribution passages 92 extending through manifold plate 72 is mated with and is in coolant flow communication with one of the ends of a coolant passage 96 in face plate 98. However, none of coolant distribution passages 92 are in coolant flow communication with more than one of coolant passages 96 in face plate 98.

Coolant passages 96, shown as parallel, longitudinal, equally spaced slots, are formed in face 100 of face plate 98. The exact shape and configuration of coolant passages 96 is not critical; however, coolant passages 96 should be arranged to evenly cool optically reflective face 102 of face plate 98. Apertures 104, shown as circular holes, extend through face plate 98 and provide openings, for example, for the transmission of a laser beam from the interior of a laser "optical cavity." Apertures 104 are shown positioned along the longitudinal center lines of lands 106 which are formed by adjacent coolant passages 96 in face plate 98. Each of coolant passages 96 in face plate 98 is mated with and is in coolant flow communication of one of coolant distribution passages 92 and one of coolant collection passages 108 in manifold plate 72. One of each adjacent pair of coolant passages 96 in face plate 98 is in coolant flow communication with a coolant distribution passage 92 in upper side 84 and a coolant collection passage 108 in lower side 90 of face 86 of manifold plate 72 and the other coolant passage of the adjacent pair of coolant passages 96 is in coolant flow communication with a coolant collection passage 108 in upper side 84 and a coolant distribution passage 92 in lower side 90 of face 86 of manifold plate 72. Accordingly, coolant flow is countercurrent or, in other words, is in opposite directions in adjacent coolant passages 96 in face plate 98.

Adjacent coolant distribution passages 92 and coolant collection passages 108 in manifold plate 72 are in coolant flow communication with the ends of adjacent coolant passages 96 in face plate 98. Adjacent coolant distribution passages 92 in manifold plate 72 are in coolant flow communication with the ends of subadjacent coolant passages 96 in face plate 98. In like manner, adjacent coolant collection passages 108 in manifold plate 72 are in coolant flow communication with the ends of subadjacent coolant passages 96 in face plate 98. Face plate 98 is bonded to and mated with manifold plate 72 such that face 93 or manifold plate 72 provides a closure for coolant passages 96 in mirror face plate 98. Heat is evenly distributed to face 93 of manifold plate 72 by coolant flowing in coolant passages 96 in face plate 98. This even heating of face 93 of manifold plate 72 helps minimize the thermal distortion of optically reflective face 102 of face plate 98 which would be caused by the uneven thermal expansion of face plate 98 relative to manifold plate 72. Coolant is only communication between manifold plate 72 and face plate 98 via coolant distribution passages 92 and coolant collection passages 108 and the ends of coolant passages 96.

Coolant collection passages 108, shown as parallel, longitudinal, equally spaced slots, are formed in upper side 84 and lower side 90 of face 86 of manifold plate 72 and extend through manifold plate 72 from face 86 to face 93. Coolant collection passages 108 are cut across or machined across upper and lower edges 94 and 95, respectively, of manifold plate 72.

One of each adjacent pair of coolant passages in manifold plate 72 is a coolant distribution passage 92 and the other coolant passage of each adjacent pair is a coolant collection passage 108. Each coolant distribution passage 92 in upper side 84 of face 86 of manifold plate 72 is on the same longitudinal axis of face 86 of manifold plate 72 as a coolant collection passage 108 in lower side 90 of face 86 of manifold plate 72. In like manner, each coolant collection passage 108 in upper side 84 of face 86 of manifold plate 72 is on the same longitudinal axis of face 86 of manifold plate 72 as a coolant distribution passage 92 in lower side 90 of face 86 of manifold plate 72. Each of coolant collection passages 108 in manifold plate 72 is in coolant flow communication with a coolant collection passage 112 in manifold plate 114. Apertures 110, shown as circular holes, extend through manifold plate 72 and are axially aligned and mated with apertures 104 in face plate 98 such that light can pass through apertures 104 and then through apertures 110.

Coolant collection passages 112, shown as parallel, longitudinal, equally spaced slots, are formed in upper side 116 and lower side 118 of face 120 of manifold plate 114. At least the upper end of each of coolant collection passages 112 in upper side 116 and at least the lower end of each of coolant collection passages 112 in lower side 118 of face of manifold plate 114 extends through manifold plate 114 from face 120 to face 121. Coolant collection passages 112 are shown as being cut or machined across the upper and lower edges 122 and 123, respectively, of manifold plate 114. Each of the ends of coolant collection passages 112 extending through manifold plate 114 is mated with and is in coolant flow communication with one of coolant collection passages 108 in manifold plate 72. Each of coolant collection passages 112 in upper side 116 of face 120 of manifold plate 114 is in coolant flow communication with one of coolant collection passages 108 in upper side 84 of face 86 of manifold plate 72. In like manner, each of coolant collection passages 112 in lower side 118 of face 120 of manifold plate 114 is in coolant flow communication with one of coolant collection passages 108 in lower side 90 of face 86 of manifold plate 72. Adjacent coolant collection passages 112 in manifold plate 114 are in coolant flow communication with adjacent coolant collection passages 108 in manifold plate 72.

The coolant collection passages 112 in upper side 116 of face 120 of manifold plate 114 are on the same longitudinal axis of face 120 of manifold plate 114 as the longitudinal center lines of the lands 124 which which are formed by adjacent coolant collection passages 112 in lower side 118 of face 120 of manifold plate 114. In like manner, the coolant collection passages 112 in lower side 118 of face 120 of manifold plate 114 are on the same longitudinal axis of face 120 of manifold plate 114 as the longitudinal center lines of the lands 125 which are formed by adjacent coolant collection passages 112 in upper side 116 of face 120 of manifold plate 114.

Manifold plate 114 is bonded to and mated with manifold plate 72 such that face 121 of manifold plate 114 acts as a closure for manifold means 82 and 88 and coolant distribution passages 92 in face 86 of manifold plate 72. Coolant collection passages 112 in upper side 116 of face 120 of manifold plate 114 are in flow communication with manifold means 126 in manifold plate 114. Coolant collection passages 112 in lower side 118 of face 120 of manifold plate 114 are in coolant flow communication with manifold means 127 in manifold plate 114. Manifold means 126 and 127, shown as transverse channels, are formed in upper side 116 and lower side 118, respectively, of face 120 of manifold plate 114. The exact shape of manifold means 126 and 127 is not critical except that manifold means 126 and 127 should collect coolant from each of coolant collection passages 112 and conduct this coolant to the appropriate exit means. Exit means 128 and 130, shown as hollow tubes, discharge coolant from manifold means 126 and exit means 132 and 134, shown as hollow tubes, discharge coolant from manifold means 127. Manifold plate 114 contains aperture 135, shown as a rectangular opening, extending through manifold plate 114 to allow light exiting from apertures 110 in manifold plate 72 to pass through manifold plate 114.

Closure plate 136 is mated with manifold plate 114 such that face 138 of closure plate 136 acts as a closure for coolant collection passages 112 and manifold means 126 and 127 in face 120 of manifold plate 114. Closure plate 136 contains aperture 140, shown as a rectangular opening, extending through closure plate 136 to allow light exiting from apertures 110 in manifold plate 72 to pass through closure plate 136.

Upper edge cover 142 and lower edge cover 144 close out the coolant passages communicating with the upper and lower edges of manifold plates 72 and 114 and face plate 98 such that there is no coolant flow communication between adjacent coolant passages. Instead of employing separate edge covers, the upper and lower edges of manifold plates 72 and 114 and face plate 98 may be electroformed over to close out the coolant passages contained therein.

It should be noted that, for the sake of clarity, the same number of coolant passages have not been shown in the manifold plates and face plate of FIG. 3 as have been shown in the manifold plates and face plate of FIG. 4. Otherwise, however, the mirrors of FIGS. 3 and 4 correspond.

Referring again to FIGS. 3 and 4, coolant enters manifold means 82 in manifold plate 72 via inlet means 74 and 76 and manifold means 88 in manifold plate 72 via inlet means 78 and 80. Manifold means 82 and 88 approximately equally distribute the inlet coolant flow to each of coolant distribution passages 92 in manifold plate 72. Coolant distribution passages 92 direct the coolant into coolant passages 96 in face plate 98. The coolant travels longitudinally and in opposite directions in adjacent coolant passages 96 and is then led into coolant collection passages 108 in manifold plate 72. Coolant collection passages 108 direct the coolant to coolant collection passages 112 in manifold plate 114. Coolant collection passages 112 direct the coolant into manifold means 126 and 127 in manifold plate 114. The coolant is then passed by manifold means 126 to exit means 128 and 130 and by manifold means 127 to exit means 132 and 134 where the coolant is discharged from mirror 70.

The mirrors of the present invention are formed from suitable materials, preferably highly heat-conductive metals such as nickel and beryllium-copper alloys. The coolant passages are formed in the face and manifold plates by conventional technique, such as by machining. The coolant employed may be any conventional material such as water. The bonding together of the face, manifold and closure plates is conducted in known manner, such as by diffusion bonding, and the optically reflective surface of the mirror is formed by techniques which are conventional in the art. For example, once the mirror has been assembled and the face, manifold and closure plates mated and bonded together, a nickel layer of approximately 2 to 3 mil thickness is applied to the face of the face plate which is to be the optically reflective surface and lapped or polished to approximately 0.5 to 1 mil thickness. A 2 to 3 mil thick silver layer is then applied to the nickel layer and lapped or polished to approximately 0.5 to 1 mil thickness. Finally, a 1 mil thick magnesium fluoride layer is applied to the silver layer and lapped or polished to approximately 0.5 mil thickness.

The mirrors of the present invention can be concave, convex or planar and can be of any convenient size. The mirrors can be used in any conventional application in which high heat flux exists at the optically reflective surface of the mirror and in which only minimal thermal distortion of the optically reflective surface can be permitted. For example, the mirror of FIGS. 1 and 2 can be used in conjunction with the partially transmissive mirror of FIGS. 3 and 4 in a conventional laser "optical cavity."

We claim:

1. A mirror comprising a first component having coolant distribution and collection passages and manifold means for receiving and distributing coolant to each of said coolant distribution passages, a second component having an optically reflective surface and coolant passages in heat-exchanging relationship with said optically reflective surface, each of the coolant passages in said second component extending so as to accord a single heat-exchanging pass across said reflective surface and being in coolant flow communication with one of the coolant distribution and one of the coolant collection passages in said first component and a third component having coolant collection passages and manifold means for collecting coolant from each of the coolant collection passages in said third component and for discharging coolant from said mirror, the coolant collection passages in said third component being in coolant flow communication with the coolant collection passages in said first component.

2. The mirror of claim 1 in which the coolant distribution and collection passages in the first component are in coolant flow communication with the ends of the coolant passages in the second component.

3. The mirror of claim 2 in which the coolant passages in the second component are substantially parallel and one end of each adjacent pair of ends of said coolant passages is in coolant flow communication with a coolant distribution passage in the first component and the other end of said adjacent pair of ends is in coolant flow communication with a coolant collection passage in said first component such that coolant flow is in opposite directions in each adjacent pair of coolant passages in said second component.

4. The mirror of claim 3 in which the coolant distribution and collection passages in the first component are substantially parallel and each adjacent pair of coolant passages in said first component is composed of a coolant distribution passage and a coolant collection passage.

5. The mirror of claim 4 in which adjacent coolant passages in the first component are in coolant flow communication with adjacent coolant passages in the second component.

6. A mirror comprising:

A. a first manifold plate having first and second faces, coolant distribution and collection passages formed in said first face, at least a portion of each of said coolant distribution and collection passages extending through said first manifold plate from said first face to said second face and manifold means formed in said first face for receiving and distributing coolant to each of said coolant distribution passages;

B. a face plate having first and second faces, coolant passages formed in and making a single pass across said first face and an optically reflective surface formed on said second face, the coolant passages and the optically reflective surface in said face plate being in heat-exchanging relationship, said face plate being mated with said first manifold plate such that the coolant passages in said face plate are in coolant flow communication with the portions of the coolant distribution and collection passages extending through said first manifold plate and such that the second face of said first manifold plate acts as a closure for the coolant passages in the first face of said face plate, each of the coolant passages in said face plate being in coolant flow communication with one of the coolant distribution and one of the coolant collection passages in said first manifold plate;

C. a second manifold plate having first and second faces, coolant collection passages formed in said first face, at least a portion of each of the coolant collection passages in said first face extending through said second manifold plate from said first face to said second face and manifold means formed in said first face for collecting coolant from each of the coolant collection passages in said second manifold plate and for discharging coolant from said mirror, said second manifold plate being mated with said first manifold plate such that the portions of the coolant collection passages extending through said second manifold plate are in coolant flow communication with the coolant collection passages in said first manifold plate and such that the second face of said second manifold plate acts as a closure for the coolant passages and manifold means in the first face of said first manifold plate; and D. closure means for the coolant collection passages and manifold means in the first face of said second manifold plate.

7. The mirror of claim 6 in which the first face of the first manifold plate has first and second sides, the coolant distribution and collection passages in said first face are substantially parallel and are formed in each of said first and second sides of said first face and each adjacent pair of coolant passages in said first manifold plate is composed of a coolant distribution passage and a coolant collection passage.

8. The mirror of claim 7 in which the coolant passages in the face plate are substantially parallel and one of each adjacent pair of coolant passages in said face plate is in coolant flow communication with a coolant distribution passage in the first side and a coolant collection passage in the second side of the first face of the first manifold plate and the other coolant passage of said adjacent pair is in flow communication with a coolant collection passage in said first side and a coolant distribution passage in said second side of said first face of said first manifold plate such that coolant flow is in opposite directions in each adjacent pair of coolant passages in said face plate.

9. The mirror of claim 8 in which adjacent coolant passages in the face plate are in coolant flow communication with adjacent coolant passages in the first manifold plate.

10. The mirror of claim 9 in which the first face of the second manifold plate has first and second sides and the coolant collection passages in said first face are substantially parallel and are formed in each of said first and second sides of said first face.

11. The mirror of claim 6 in which the mirror is one of the mirrors of a laser "optical cavity."

12. A thermally compensated mirror comprising a leafed structure having:
- a first plate having an optically reflective outer surface and coolant passageways within the plate, each passageway providing for at least a single pass of a fluid in heat-exchanging relationship with said reflective outer surface;
- an inlet plate situated behind the side of said first plate which is opposite the reflective outer surface, said inlet plate having coolant distribution and collection passageways communicating with the coolant passageways in said first plate;
- an exit manifold plate situated behind the side of said inlet plate which is remote from said first plate for discharging heated fluid, said exit manifold plate having an exit manifold communicating with the collection passageways of said inlet plate and with a fluid discharge means; and
- fluid input means connected to supply coolant to said coolant distribution passageways of said inlet plate whereby, in operation, thermal distortion between said optically reflective outer surface of said first plate and said exit manifold plate is minimized.

13. The mirror of claim 12, wherein:
said passageways are formed in the surfaces of said plates; and
said plates are secured in contiguous relation such that the surface of each plate serves to close the passageways in each adjacent plate.

14. The mirror of claim 12, wherein:
two sets of said coolant passageways are formed in said first plate, and
the direction of flow of coolant through each of said coolant passageways is counter to the flow of coolant through each adjacent coolant passageway.

* * * * *